March 27, 1962    E. E. ROACH    3,026,903
MAGNETIC CHECK VALVE
Filed April 27, 1959
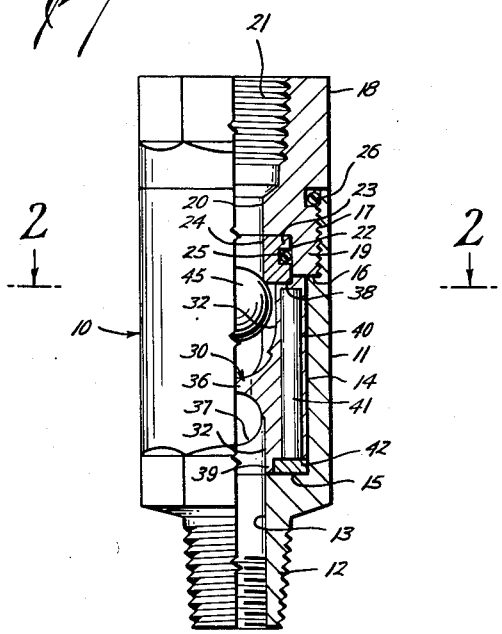
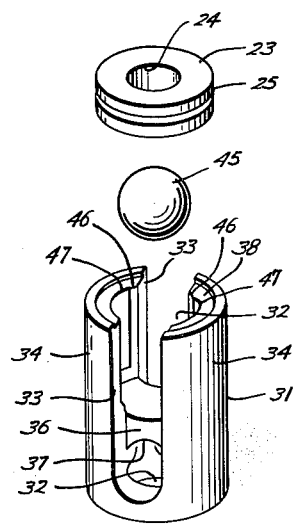
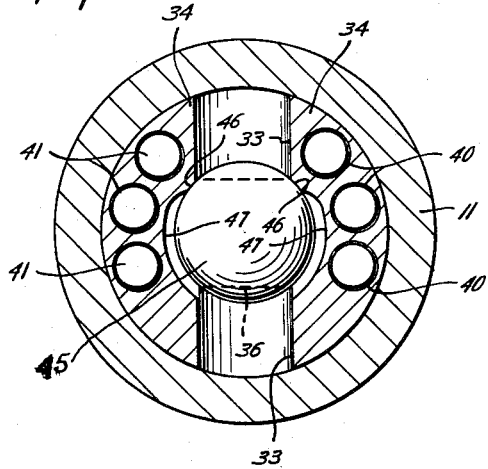
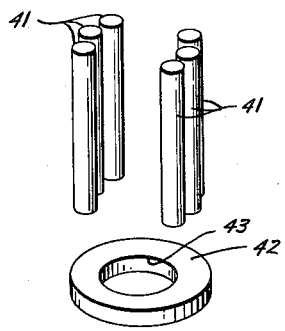
Erskine E. Roach
INVENTOR.
BY
ATTORNEY

United States Patent Office 3,026,903
Patented Mar. 27, 1962

3,026,903
MAGNETIC CHECK VALVE
Erskine E. Roach, Houston, Tex., assignor to Harold Brown Company, a corporation of Texas
Filed Apr. 27, 1959, Ser. No. 808,963
18 Claims. (Cl. 137—533.13)

This application is a continuation-in-part of my co-pending application Serial No. 674,329, filed July 26, 1957 which issued June 7, 1960, as Patent No. 2,939,475.

This invention relates to magnetic check valves and also to a magnetic cage-and-valve construction comprising a subcombination structure or a sub-assembly suitable for employment in check valves.

Conventional check valves are normally designed to permit fluid flow in one direction through a conduit while preventing fluid flow in the opposite direction through the conduit. Such conventional check valves employ various means for moving the closure member or valve element toward its seat. In one form, gravity is depended upon to cause the closure member to drop to its seat; another form depends upon the velocity of the fluid seeking to flow back through the valve; a third, and perhaps most common construction, employs a resilient means, such as a coil spring, to bias the closure member toward its seat.

Each of these more conventional arrangements is subject to numerous operating difficulties. In the case of gravity-responsive valves, the valve must be mounted in a certain position which is not always practical and is, indeed, impractical in many installations. Check valves moved by velocity of fluid flow therethrough often are not satisfactory because frequent erosion damage which results particularly where frequent opening and closing of the valve occurs as fluid flow may vary in the flow conduit. Moreover, since closing of the valve is dependent upon velocity of flow of the fluid, it will be apparent that where there is a low pressure differential across the valve, a considerable amount of fluid may be passed before the valve member is moved by fluid velocity to its seat. Spring-loaded check valves have a strong tendency to "chatter" or "hammer," thereby causing damage to the valve mechanism. Moreover, where the valve is subject to relatively high frequency vibrations, the return-spring will be subject to a high degree of fatigue, resulting normally in a relatively short life.

In all such conventional designs, therefore, difficulty with the check valve elements may, and frequently will, result in expensive interruptions of the system in which the valve is mounted for purposes of repair or replacement.

To overcome the short-comings of existing types of check valves, the present application, like the afore-mentioned co-pending application, is directed to a magnetic check valve.

In accordance with my invention, the check valve structure employs a cage which comprises a permanent magnet whose field intensity increases in the direction of one end thereof, and a magnetically permeable closure or valve element disposed within the cage to move therein in the direction of the field. By positioning such a cage in a fluid flow passage with the end having the greatest field intensity adjacent a valve seat disposed in the flow passage, the valve element will normally be urged against the seat in response to the direction of the magnetic field and will resist movement in the opposite direction to an extent determined by the strength of the magnetic field.

With check valves constructed in accordance with the present invention, the magnetic force serves as the force for returning the valve element to the valve seat, and it will be obvious that by employing magnetic force, the position of the valve becomes immaterial, springs are eliminated, and fluid flow velocity or the magnitude of the pressure differential across the valve becomes relatively immaterial in effecting movement of the valve toward its seat to prevent reverse flow therethrough.

Accordingly, it is a principal object of this invention to provide an improved check valve which employs a magnetically-actuated return means for the valve element.

Another object is to provide a magnetic check valve employing a valve cage comprising a permanent magnet and a magnetically permeable closure member movable in the cage in the direction of the increasing intensity of the magnetic field of the cage.

A further object is to provide a device for controlling a flow port, defined by an annular seat, which comprises a generally tubular valve cage aligned with the port, the valve cage comprising a permanent magnet whose field varies in intensity in a direction parallel to the axis of the cage, and which includes a closure member movable within the cage in a direction relative to the seat in accordance with the direction of increasing intensity of the magnetic field of the cage.

In many instances, the fluids passing through the check valve may be relatively corrosive to the cage, particularly when the cage is, itself, a permanent magnet, and the fluid may carry debris, such as metal scale, or other particles which tend to stick to the magnetic surfaces and may hinder movement of the closure element in the cage.

Accordingly, the present invention contemplates additional improvements to meet the last-mentioned conditions in providing a construction wherein the cage body is constructed of non-magnetic, corrosion-resisting material, but has enclosed within its walls permanent magnets which are thus protected from contact with the surrounding fluid; but which, nevertheless, create the necessary magnetic field within the cage.

A further object is to provide a magnetic cage-and-valve construction in which the cage is of substantially tubular shape and is provided interiorly thereof with a pair of parallel guide lands positioned along one side of the cage along which the valve element may be guided in order to center it with respect to the valve seat, the lands being raised with respect to the bore wall of the cage, thereby providing a clearance space between the valve element and the bore wall of the cage through which scale or other debris may fall or be moved out of the path of movement of the valve element.

An additional object is to provide a cage-and-valve construction for check valves in which the cage comprises a permanent magnet having a field intensity increasing toward one end and along one side of the cage, whereby to influence movement of the valve element along said one side and toward said one end.

Other and more specific objects and advantages of this invention will become more readily apparent from the following detailed description when read in conjunction with the accompanying drawing, which illustrates a useful embodiment in accordance with this invention.

In the drawing:

FIG. 1 is a longitudinal, quarter-sectional view of a check valve in accordance with the present invention;

FIG. 2 is a cross-sectional view taken generally along line 2—2 of FIG. 1; and

FIG. 3 is an exploded view, in perspective, of the cage, valve and seat elements of the check valve.

Referring to the drawing, there is shown a check valve body, designated generally by the numeral 10, and comprising the tubular casing 11 having at one end the reduced diameter tapered pin 12 which may be threaded both externally and internally for connection to a fluid conduit. Pin 12 has an axial bore 13 which is enlarged inside casing 11 to form the enlarged bore 14 and defining the annular shoulder 15 between bores 13 and 14. At its outer end bore 14 is further enlarged to form the socket 17 and to define the outwardly facing shoulder 16. Socket 17 is threaded internally for the reception of a male coupling member 18 having an externally threaded pin 19 adapted to be screwed into threads in socket 17 and to seat on shoulder 16. Coupling member 18 is provided with an axial bore 20 co-axial with and of substantially the same diameter as bore 13, and which opens at its outer end into an internally threaded box 21 by means of which the check valve body may be connected to a fluid conduit.

At its inner end pin 19 is counter-bored to form the socket 22 adapted to removably receive an annular valve seat ring 23 having an axial bore 24 substantially flush with bore 20. An O-ring seal 25 is mounted circumferentially in the external periphery of seat ring 23 to seal with the wall of socket 22. An O-ring seal 26 is also provided between the exterior of pin member 19 at the base of the threads thereon and the adjacent end of housing 11 to form a fluid-tight seal therewith.

Mounted in bore 14 is a magnetic cage-and-valve structure, designated generally by the numeral 30.

As best seen in FIG. 3, the cage-and-valve structure comprises a generally tubular cage 31 having an axial bore 32 and longitudinal slots 33 at diametrically opposite points through the wall thereof extending from one end of the cage to points adjacent the other end. The slots serve to define a pair of arcuate cage sections 34—34 separated by the slots 33. A web 36, integrally formed with the cage sections 34, extends across bore 32 at a point intermediate the ends thereof and is of substantially the same width as bore 32. An opening 37 is bored transversely through web 36 at a point above the closed ends of slots 33 and intersects bore 32. With the arrangement of parts described, it will be seen that a flow passage is provided through the cage which includes the lower end of bore 32, opening 37, slots 33, and the portion of bore 32 above web 36. The cage is counter-bored from its upper end to a shallow depth to provide the socket 38 for reception of one end of valve seat 23. At the end opposite socket 38, cage 31 is reduced in diameter to provide a short tubular extension (FIG. 1). The wall of each of the cage sections 34 is longitudinally bored from its lower end outside the perimeter of extension 39 to a point just short of its upper end to provide a plurality of cylindrical receptacles 40 in which are mounted closely-fitting cylindrical rods 41, preferably constructed of Alnico or similar material which is adapted to be magnetized in the well-known manner to form permanent magnets. In the illustrative embodiment, it will be noted that the rods 41 and their receptacles are positioned closer to one of the longitudinal edges of the sections 34, for purposes which will be explained more fully hereinafter. The lower ends of the receptacles 40 are closed by means of a base ring 42 having an axial bore 43 which is adapted to tightly receive extension 39 and to enable ring 42 to fit tightly against the end of cage 31, and to thereby hold magnets 41 tightly in place in receptacles 40.

In the illustrative embodiment cage 31 will preferably be constructed of a corrosion-resistant non-magnetic material, such as "KR" Monel metal. Ring 42 will be constructed of any suitable magnetically permeable material, such as nickel, and will be tightly soldered to the end of cage 31.

With rods 41 in place within the walls of cage section 34 and base ring 42 secured in place, the cage assembly will be subjected to a magnetizing force in any conventional and well-known manner, whereby rods 41 will become permanently magnetized and cage 31 will then comprise a permanent magnet, sections 34—34 defining north and south magnetic poles and slots 33 comprising the air gaps therebetween. Base ring 42 provides the return portion of the magnetic circuit. With this arrangement the intensity of the magnetic field will increase generally longitudinally of the cage in the direction of the unconnected ends of sections 34—34.

Positioned in the portion of bore 32 of the cage above web 36 is a closure element or valve 45, which, in the preferred embodiment is ball-shaped, as shown. Valve 45 is constructed of a highly magnetically permeable material, which is preferably very hard and resistant to corrosive conditions which may be encountered in use. Valves constructed of titanium carbide are found to have these several desirable properties, although steel, where the conditions of use do not require special hardness or a high degree of corrosion resistance, may be used. With the cage magnetized as described, valve 45 will always tend to move in the direction of increasing intensity of the magnetic field, that is, longitudinally toward the end of the cage in which seat ring 23 is mounted, and will thus normally engage seat ring 23 and close bore 24 through the seat ring. The magnetic force thus exerted on valve element 45 will function in the same manner as a spring in normally urging the valve toward the seat while providing a comparatively small force opposing movement of the valve away from the seat when fluid is flowing through the valve structure in the valve-opening direction.

A pair of longitudinally extending, radially inwardly projecting guide lands 46—46 are provided in bore 32 for guiding valve 45 longitudinally of the cage and for centering the valve with respect to bore 24 of the seat ring. These lands are positioned along the opposite inner side edges of pole sections 34—34 adjacent the corners formed by the intersection of one of the slots 33 with bore 32. The lands 46 are formed to constitute elements of a cylinder whose longitudinal axis coincides with that of bore 24, thereby centering valve 45 with the bore as it moves along the lands in engagement therewith. Valve 45 is preferentially attracted into a maintained contact with the lands by concentrating the magnetic force along the side of the cage where the lands are located, this being accomplished by positioning magnetic rods 41 closer to that side of the cage as previously described. The portions of the wall of bore 32 extending between the lands and the opposite edges of cage sections 34—34 are cut back to provide the arcuate relief spaces 47 to thereby provide space between the valve and the wall of the cage through which scale or other detritus may pass without interfering with the centered movement of the valve relative to the seat.

Also by concentrating the magnetic force along one side of the cage, as described, not only will the valve be held to a path of movement along the guide lands, but the magnetic attraction exerted in the valve will provide resistance to rotation of the ball which in most instances greatly reduces erosion of the valve element.

In assembling the check valve, the cage assembly and valve 45 will be inserted in bore 14 of the valve housing and seated on shoulder 15. Valve seat 23 will ordinarily be seated in socket 38 when the assembly is inserted in bore 14. Pin 19 of coupling 18 will then be screwed into socket 17, seat socket 22 receiving the outer end of seat ring 23 as pin 19 is screwed down against shoulder 16 to complete assembly of the check valve structure. The latter is then ready for installation in a fluid conduit to which the valve housing may be connected by means of coupling 18 and pin 12. When the check valve is assembled, it will be seen that cage 31 defines a portion of the flow passage through the valve housing. Valve housing 11 and coupling member 18 will ordinarily be constructed of non-magnetic material or material which will have relatively low magnetic permeability.

The arrangement described wherein the permanent magnets are fully encased within the walls of the cage segments is particularly advantageous where the valve is to be employed in controlling the flow of fluids which are corrosive to magnetic materials such as Alnico. In such cases, as mentioned, the cage body may be constructed of corrosion-resistant non-magnetic material, without appreciably sacrificing the desired magnetic properties of the final assembly.

Where conditions warrant the cage body itself may be constructed entirely of Alnico or the like and itself comprise the permanent magnet, as described in my aforesaid co-pending application. Also, as described in the latter, the cage may be formed with more than two pole segments, and the valve element may be cylindrical or of other suitable shape. Also, bore 32 of the cage may have a non-magnetic insert or liner in the bore of which the valve member may be installed.

Cage 31 and valve 45, with or without seat ring 23, may be manufactured and marketed as sub-assemblies for installation in existing check valve housings in place of more conventional types of check valve elements.

While in the illustrative embodiment, three cylindrical rod magnets 41 are employed in each cage section, it will be evident that the number, size, shape, and spacing of these magnets may be varied widely, as may be desired.

In some cases, it may be found desirable to have ball valve 45 seat against a resilient seating surface, rather than directly against the metal edge defining bore 24. In such cases, the lower end of bore 24 may be inwardly and upwardly bevelled and the resilient seat ring mounted at the upper end of the bevelled surface. In order to assure movement of the valve for the additional distance required to engage the resilient seat ring, the magnetic field may be extended into the lower end of the seat ring in any suitable manner. This may be done by installing in the lower end of seat ring 23 a pair of arcuate inserts, constructed of magnetically permeable material and coinciding generally in shape and area with the bottoms of the arcuate sections comprising socket 38.

It will be understood that various other changes and modifications may be made in the details of the illustrative embodiment within the scope of the appended claims without departing from the spirit of this invention.

What I claim and desire to secure by Letters Patent is:

1. A magnetic check valve, comprising, a body having a flow passage therethrough, an annular seat in the passage, a valve cage mounted in the passage with one end adjacent said seat, said cage comprising, a generally tubular cage body having a cylindrical bore co-axial with said seat and constructed of substantially non-magnetic material, said body being defined by a plurality of longitudinally extending spaced parallel portions, permanent magnets encased within said portions and extending longitudinally thereof, a magnetically permeable connector member secured to said portions adjacent the end thereof opposite said one end and in contact with the adjacent ends of said magnets whereby to form with said magnets a magnetic circuit whose field intensity increases toward said one end, and a magnetically permeable valve element disposed in said bore for movement longitudinally thereof into closing engagement with said seat under the influence of said field.

2. A magnetic check valve according to claim 1 wherein said valve element is ball-shaped.

3. A magnetic check valve, comprising, a body having a flow passage therethrough, an annular seat in the passage, a generally tubular valve cage mounted in the passage with one end adjacent the seat and having a longitudinal bore therein, said cage comprising a permanent magnet whose field intensity increases toward said one end and along one side of the cage, a magnetically permeable valve element disposed within said bore for movement into closing engagement with said seat under the influence of said field, and a pair of inwardly projecting spaced parallel guide lands for the valve element extending longitudinally of the wall of said bore at said one side thereof, the guide faces of said lands comprising elements of a cylinder whose axis is coincident with the axis of said seat.

4. A magnetic check valve according to claim 3 wherein said valve element is ball-shaped.

5. A magnetic check valve, comprising, a body having a flow passage therethrough, an annular seat in said passage, a generally tubular valve cage mounted in the flow passage with one end adjacent said seat, said cage having a cylindrical bore co-axial with said seat and comprising a permanent magnet whose field intensity increases toward said one end and along one side of the cage, said cage being defined by a plurality of longitudinally extending spaced parallel portions forming magnetic pole members and means connecting said portions together at a point spaced from said one end, a magnetically permeable valve element disposed within said bore for movement longitudinally thereof into closing engagement with said seat under the influence of said field, and a pair of inwardly projecting spaced parallel guide lands for the valve element extending longitudinally of the inner walls of adjacent ones of said portions at said one side of said bore, the guide faces of said lands comprising elements of a cylinder whose axis is coincident with the axis of said bore.

6. A magnetic check valve, comprising, a body having a flow passage therethrough, an annular seat in said passage, a generally tubular valve cage mounted in the flow passage with one end adjacent said seat, said cage having a cylindrical bore co-axial with said seat and comprising a permanent magnet whose field intensity increases toward said one end and along one side thereof, said cage being defined by a plurality of longitudinally extending spaced parallel portions forming magnetic pole members and means connecting said portions together at a point spaced from said one end, a magnetically permeable valve element disposed within said bore for movement longitudinally thereof into closing engagement with said seat under the influence of said field, and a pair of inwardly projecting spaced parallel guide lands for the valve element extending longitudinally of the inner walls of adjacent ones of said portions at said one side of said bore, the guide faces of said lands comprising elements of a cylinder whose axis is coincident with the axis of said bore.

7. A magnetic check valve, comprising, a body having a flow passage therethrough, an annular seat in said passage, a valve cage mounted in said passage with one end adjacent said seat, said cage comprising a generally tubular cage body having a bore co-axial with said seat and constructed of substantially non-magnetic material, said body being defined by a pair of longitudinally extending parallel portions separated by diametrically spaced air gaps, permanent magnets encased within the walls of said portions and extending longitudinally thereof, a magnetically permeable connector member secured to said portions adjacent the end thereof opposite said one end and in contact with the adjacent ends of said magnets whereby to form with said magnets a magnetic circuit whose field intensity increases toward said one end, a magnetically permeable ball-shaped valve element disposed in said bore for movement longitudinally thereof into closing engagement with said seat under the influence of said field, a pair of inwardly projecting spaced parallel guide lands for the valve element extending longitudinally of the wall of said bore adjacent to and on opposite sides of one of said air gaps, the guide faces of said lands comprising elements of a cylinder whose axis is coincident with the axis of said seat, said magnets being positioned in the respective cage portions nearer said one of said air gaps than the other of said air gaps.

8. As a sub-combination, a cage-and-valve construction for a check valve assembly, comprising, a generally tubular cage body having a cylindrical bore and constructed of substantially non-magnetic material, said body being defined by a plurality of longitudinally extending spaced parallel portions, permanent magnets encased within the walls of said portions and extending longitudinally thereof, a magnetically permeable connector member secured to said portions adjacent one end thereof and in contact with the adjacent ends of said magnets whereby to form with said magnets a magnetic circuit whose field intensity increases toward the unconnected ends of said portions, and a magnetically permeable valve element disposed in said bore for movement longitudinally thereof in the direction of said field.

9. As a sub-combination, a cage-and-valve construction for a check valve assembly, comprising, a generally tubular cage body having a cylindrical bore, said body comprising at least two longitudinally extending spaced parallel portions and means connecting said portions together at a point spaced from one end thereof, said portions and said connecting means defining a permanent magnet whose field intensity increases in the direction of said one end and along one side of the body, a magnetically permeable valve element disposed within said bore for movement longitudinally thereof toward said one end under the influence of said field, and a pair of inwardly projecting spaced parallel guide lands for said valve element extending longitudinally of the inner walls of adjacent ones of said portions and at said one side of said bore, the guide faces of said lands comprising elements of a cylinder whose axis is coincident with the axis of said bore.

10. As a sub-combination, a cage-and-valve construction for a check valve assembly, comprising, a generally tubular cage body having a cylindrical bore and constructed of substantially non-magnetic material, said body being defined by two longitudinally extending portions circumferentially spaced apart to provide longitudinal air gaps between opposite edges of said portions and means connecting said portions together at a point spaced from one end thereof, permanent magnets encased within the walls of each of said portions and extending longitudinally thereof, a magnetically permeable connector member secured to said portions in contact with the adjacent ends of said magnets whereby to form with said magnets a magnetic circuit whose field intensity increases in the direction of the unconnected ends of said portions, and a magnetically permeable valve element disposed in said bore for movement longitudinally thereof in the direction of said field.

11. As a sub-combination, a cage-and-valve construction for a check valve assembly, comprising, a generally tubular cage body having a cylindrical bore and constructed of substantially non-magnetic material, said body being defined by two longitudinally extending portions circumferentially spaced apart to provide longitudinal air gaps between opposite edges of said portions and means connecting said portions together at a point spaced from one end thereof, permanent magnets encased within each of said portions and extending longitudinally thereof, said magnets being positioned in the respective portions nearer to one of said air gaps than to the other, a magnetically permeable connector member secured to said portions in contact with the adjacent ends of said magnets whereby to form with said magnets a magnetic circuit whose field intensity increases in the direction of the unconnected ends of said portions, and a magnetically permeable valve element disposed in said bore for movement longitudinally thereof in the direction of said field.

12. As a sub-combination, a cage-and-valve construction for a check valve assembly comprising, a generally tubular cage body having a longitudinal bore and constructed of substantially non-magnetic material, permanent magnet members encased within the wall of said body on opposite sides of said bore and extending longitudinally of the body, a magnetically permeable connector member secured to one end of said body and in contact with the adjacent ends of said magnet members whereby to form with said magnet members a magnetic circuit whose field intensity increases toward the end of the body opposite said one end, and a magnetically permeable valve element disposed in said bore for movement longitudinally thereof in the direction of said field.

13. A cage-and-valve construction according to claim 12, wherein said valve element is ball-shaped.

14. A cage-and-valve construction according to claim 12, wherein said permanent magnet members are of generally cylindrical shape.

15. As a sub-combination, a cage-and-valve construction for a check valve assembly, comprising, a generally tubular cage body having a longitudinal bore and constructed of substantially non-magnetic material, permanent magnet members encased within the ball of said body on opposite sides of said bore and extending longitudinally of the body, a magnetically permeable connector member secured to one end of said body and in contact with the adjacent ends of said magnet members, the magnet members being relatively spaced about said body and with respect to each other to form with said connector member a magnetic circuit whose field intensity increases toward the end of the body opposite said one end and along one said thereof, and a magnetically permeable valve element disposed in said bore for movement longitudinally in the direction of the increasing field intensity.

16. A cage-and-valve construction according to claim 15, having a pair of inwardly projecting spaced parallel guide lands for the valve element extending longitudinally of the wall of said bore along said one side thereof, the guide faces of said lands comprising elements of a cylinder whose axis is coincident with the axis of said seat.

17. A cage-and-valve construction according to claim 15, wherein said valve element is ball-shaped.

18. A cage-and-valve construction according to claim 15, wherein said permanent magnet members are of generally cylindrical shape.

References Cited in the file of this patent

UNITED STATES PATENTS

| | | |
|---|---|---|
| 2,597,952 | Rosenlund | May 27, 1952 |
| 2,667,895 | Pool | Feb. 2, 1954 |
| 2,869,563 | Schoengrun | Jan. 20, 1959 |
| 2,939,475 | Roach | June 7, 1960 |

FOREIGN PATENTS

| | | |
|---|---|---|
| 744,858 | Great Britain | Feb. 15, 1956 |